Dec. 31, 1929. C. W. HOUGH 1,741,518
CORRECTION OF POWER FACTOR IN INDUCTION MOTORS
Filed Feb. 27, 1925 2 Sheets-Sheet 1
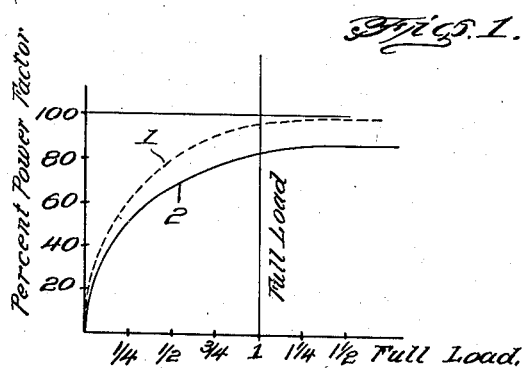
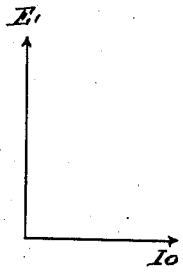
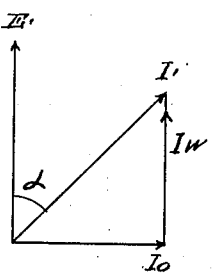
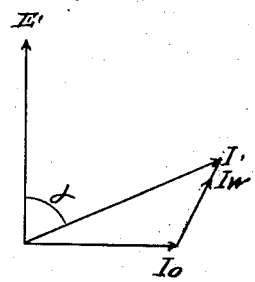
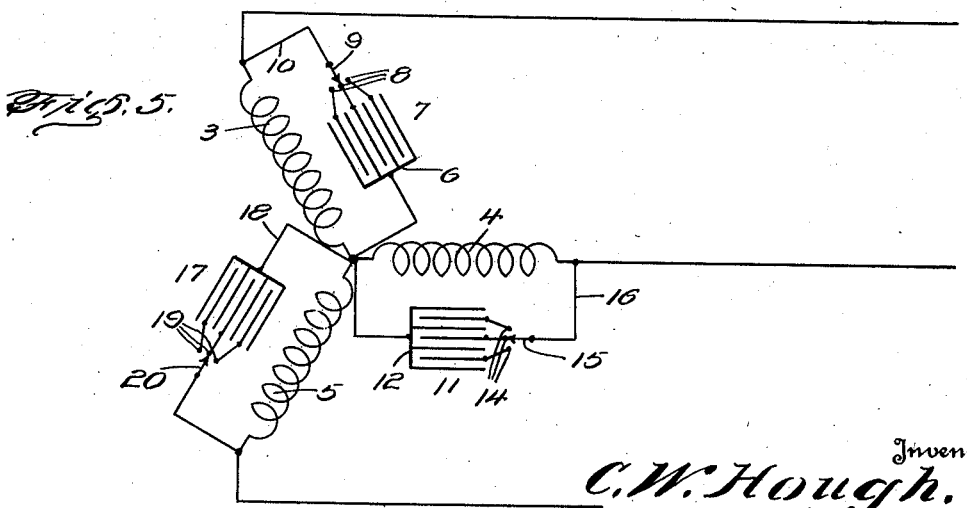
Inventor
C. W. Hough.
By John P. Brady
Attorney Dec. 31, 1929.　　　　C. W. HOUGH　　　　1,741,518
CORRECTION OF POWER FACTOR IN INDUCTION MOTORS
Filed Feb. 27, 1925　　　　2 Sheets-Sheet 2
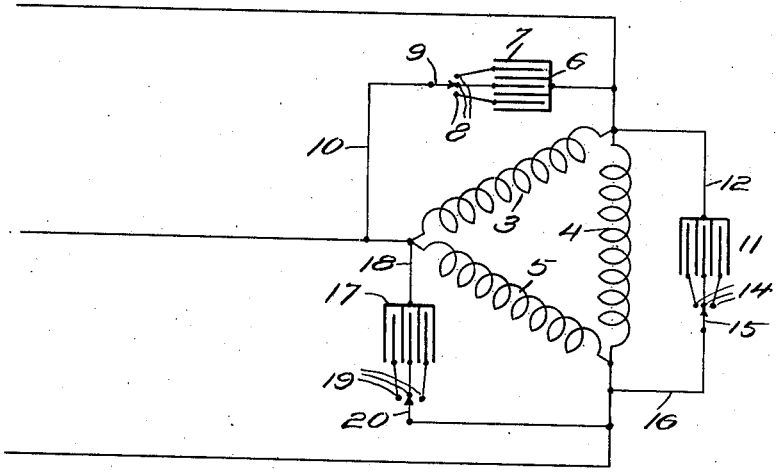
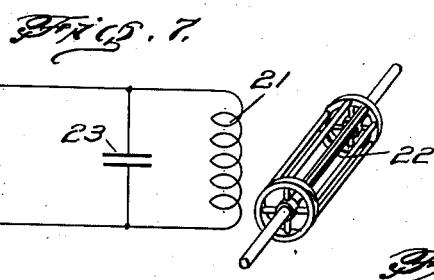
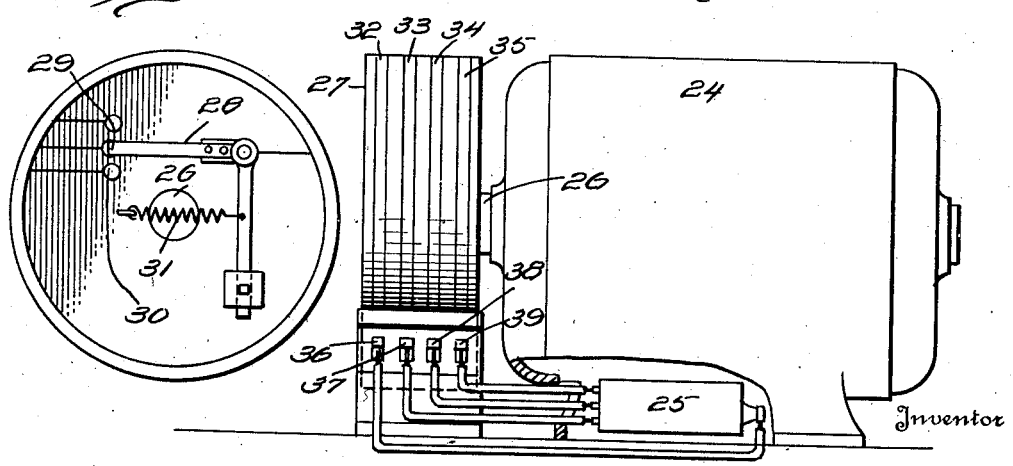
Inventor
C. W. Hough.
By John B. Brady
Attorney Patented Dec. 31, 1929

1,741,518

UNITED STATES PATENT OFFICE

CLINTON W. HOUGH, OF BOONVILLE, NEW YORK, ASSIGNOR TO WIRED RADIO, INC., OF NEW YORK, N. Y., A CORPORATION OF DELAWARE

CORRECTION OF POWER FACTOR IN INDUCTION MOTORS

Application filed February 27, 1925. Serial No. 12,164.

My invention relates broadly to induction motor systems and more particularly to means for correcting the power factor of induction motors at different loads.

One of the objects of my invention is to provide electrostatic means for correcting for variation in power factor in an induction motor system whereby the angular relationship between current and voltage may be maintained constant under conditions of varying load.

Another object of my invention is to provide an induction motor system having means carried by the motor for maintaining the power factor constant under conditions of varying load.

Still another object of my invention is to provide means in a polyphase induction motor system whereby the power factor across each of the motor windings may be maintained constant under conditions of varying load.

A further object of my invention is to provide a compact assembly of condensers and centrifugal means operated by the induction motor for automatically varying the capacity across each of the windings in accordance with the variation in load, whereby the power factor in the induction motor system may be maintained constant under conditions of varying load.

My invention will be more fully understood from the specification hereinafter following, by reference to the accompanying drawings, in which Figure 1 is a characteristic curve of the falling power factor characteristic of an induction motor system in accordance with the increase in load; Figs. 2, 3 and 4 are vector diagrams illustrating the relation of current and voltage in the windings of the induction motor system and showing the lagging current characteristic of the motor system under conditions of full load; Fig. 5 shows the application of my invention for correcting power factor of a star connected polyphase induction motor system; Fig. 6 illustrates the application of my invention to a delta connected induction motor system; Fig. 7 represents the application of my invention to a single phase induction motor; Figs. 8 and 9 show one of the embodiments of my invention in an induction motor illustrating one of the possible arrangements of the operating parts in inducton motor systems.

In induction motor systems increase in load decreases the speed of the motor and current passing through the rotor windings develops the driving torque of the machine. This current tends to demagnetize the motor, that is to oppose the flux which produces it. The tendency of the reduction in the flux causes the back E. M. F. to decrease and allow a larger current to flow in the primary or stator winding, and in this way the stator current adjusts itself to suit the requirements of the secondary or rotor.

The reduction in the value of the flux is relatively small so that at full load a magnetizing component of current $1_0$ illustrated in Figs. 2, 3 and 4 is still required to produce the revolving field while a power component $1_w$ indicated in Figs. 3 and 4 in phase with the applied voltage is required for the load. The voltage applied to the stator has been indicated at $E_1$ with the current $1_0$ normally lagging 90 degrees. The power factor of an induction motor, that is the ratio of actual power to apparent power is determined as follows:

$$\text{power factor} = \frac{\text{actual power}}{\text{apparent power}}$$

$$= \frac{EI \cos \alpha}{EI}$$

$$= \cos \alpha$$

The power factor of an induction motor, that is the value of $\cos \alpha$ is therefore apparently zero at no-load as represented in Fig.

2 and gradually increases as the load increases as shown in curve 1 in Fig. 1. By reason of the reactance of the stator and rotor windings, which reactance increases with the load, the current lags behind the voltage as represented in Fig. 3, the lag increasing as represented in Fig. 4 under condition of full load with the result that the power factor in an induction motor system changes with the load as represented by curve 2 in Fig. 1. The no-load relation of the voltage and current has been illustrated in Fig. 2. The ideal relationship of the voltage and current under condition of full load is represented in Fig. 3, but the actual full load conditions may be observed from Fig. 4 with the variation between the conditions of Figs. 3 and 4 in accordance with the change of load.

My invention contemplates the correction of these variations in power factor and the maintenance of substantially constant power factor independent of the load. In Fig. 5 I have illustrated a three phase star connected induction motor system having windings 3, 4 and 5. Winding 3 has one side 6 of an electro-static condenser 7 connected thereto while selected parts of condenser 7 are tapped at points 8 whereby a variable contacting device 9 may select different capacities from the condenser for connection across the winding 3 as represented by the lead 10. The winding 4 has an electrostatic condenser 11 connected thereto where one side of the condenser at 12 connects with one side of the winding 4 while portions of the condenser 11 are tapped to contacts 14 which may be selected by a movable contact 15 connected through lead 16 with one side of winding 4. Similarly the winding 5 has a condenser 17 connected thereacross with one terminal 18 connected with one end of the winding while sections of the condenser are tapped to contacts 19 over which selector switch 20 may be moved to connect the desired capacities with the motor winding 5. In Fig. 6 I have shown the arrangement of windings in a delta connected induction motor system and in which similar reference characters have been used as are used in Fig. 5.

In Fig. 7 I have shown an arrangement for correcting for lagging power factor in a single phase squirrel cage type of induction motor wherein a fixed condenser of selected capacity is associated with the stator winding and proportioned to the variation in loads which would normally occur on the machine. The stator winding has been indicated by reference character 21 and the squirrel cage rotor has been designated by reference character 22. The fixed condenser of selected capacity which corrects for power factor variation is shown at 23.

The electrical condenser which I have referred to in describing my invention may be of mica, paper or other suitable dielectric and the capacity of the condenser may be selected of such a value that it may be permanently fixed with relation to the stator windings. This condenser may be housed within the base of the frame 24 of the induction motor in such manner that the motor with the power factor correction means connected therewith may be furnished complete ready for connection to the power mains. In Fig. 8 I have shown the condenser disposed within the base of the induction motor and inside the housing 24. The motor may be provided with an extended shaft 26 carrying a cylindrical housing 27 containing a centrifugal switch 28 operative under variation in load and proportional variation in speed, to move a contact 29 over a series of switch contacts 30. The centrifugal switch 28 may be normally spring pressed as indicated by reference character 31 to normally maintain contact 29 in position to connect a selected capacity in the stator circuit, the switch being so arranged to select other capacities for connection in the stator circuit under conditions of varying load. Any suitable means may be employed to mechanically carry out this invention and the diagrams I have shown are merely for the purpose of illustrating the character of the invention. Slip rings 32, 33, 34 and 35 may be employed in association with brush contacts 36, 37, 38 and 39 to establish connections with the sections of the condenser 25 and with the stator windings.

While I have illustrated my invention in certain particular embodiments I desire it to be understood that the applications of the invention have been described only to illustrate the broad principle thereof and that I intend no limitations upon the invention other than are imposed by the scope of the appended claims.

What I claim and desire to secure by Letters Patent of the United States is as follows:

1. An induction motor system comprising in combination a motor frame, a stator winding, a rotor, and a shaft, said shaft having mounted thereon a plurality of slip rings adapted for rotation therewith, a circuit making and breaking device mounted within said slip rings, centrifugally operated means associated with said circuit making and breaking device for establishing connections between different ones of said slip rings and said circuit making and breaking device at different angular velocities of said shaft, a multi-sectioned condenser associated with said motor, and connections between said sections of said condenser and brushes associated with said slip rings.

2. An induction motor system comprising in combination a motor frame, a hollow base for said frame, a stator winding, a rotor, a terminal block mounted adjacent said hollow base, slip rings mounted to rotate with said rotor, said slip rings being connected with a centrifugal switch mechanism, said centrifugal switch mechanism being mounted within said slip rings, brush contacts carried by said terminal block for providing sliding contact with said slip rings, a multi-section condenser positioned within said hollow base, sections of said condenser being connected with said brush contacts whereby different sections of said condenser are connected into circuit with said induction motor at different angular velocities of said rotor.

In testimony whereof I affix my signature.

CLINTON W. HOUGH.